(12) United States Patent
Wang et al.

(10) Patent No.: US 10,046,459 B2
(45) Date of Patent: Aug. 14, 2018

(54) THREE-DIMENSIONAL VISUAL SERVOING FOR ROBOT POSITIONING

(71) Applicant: ABB Technology AG, Zurich (CH)

(72) Inventors: Jianjun Wang, West Hartford, CT (US); Biao Zhang, West Hartford, CT (US); Carlos Martinez, South Windsor, CT (US); Carlos Winsor Morato, Avon, CT (US)

(73) Assignee: ABB Schweiz AG, Baden (CH)

( * ) Notice: Subject to any disclaimer, the term of this patent is extended or adjusted under 35 U.S.C. 154(b) by 52 days.

(21) Appl. No.: 14/941,832

(22) Filed: Nov. 16, 2015

(65) Prior Publication Data

US 2017/0140539 A1 May 18, 2017

(51) Int. Cl.
*G06K 9/00* (2006.01)
*B25J 9/16* (2006.01)
*G06T 7/73* (2017.01)

(52) U.S. Cl.
CPC ............... *B25J 9/1687* (2013.01); *G06T 7/73* (2017.01); *G06T 2207/10024* (2013.01); *G06T 2207/10028* (2013.01); *G06T 2207/20061* (2013.01)

(58) Field of Classification Search
CPC .... B25J 9/1687; G06T 7/0044; G06T 7/0075; G06T 2207/10024; G06T 2207/10028; G06T 2207/20061
See application file for complete search history.

(56) References Cited

U.S. PATENT DOCUMENTS

| | | | |
|---|---|---|---|
| 9,684,305 B2 * | 6/2017 | Kratz | G05D 1/0038 |
| 2005/0099637 A1 | 5/2005 | Kacyra et al. | |
| 2009/0033655 A1 | 2/2009 | Boca et al. | |
| 2013/0066335 A1 * | 3/2013 | Barwinkel | A61B 19/201 606/130 |
| 2013/0274596 A1 * | 10/2013 | Azizian | A61B 5/0071 600/424 |
| 2014/0125767 A1 * | 5/2014 | Bell | H04N 13/0203 348/46 |
| 2014/0316636 A1 * | 10/2014 | Hong | G05D 1/0016 701/27 |
| 2015/0105907 A1 * | 4/2015 | Aiso | B25J 9/1697 700/259 |

OTHER PUBLICATIONS

Wang, Jiang, and William J. Wilson. "3D relative position and orientation estimation using Kalman filter for robot control." Robotics and Automation, 1992. Proceedings., 1992 IEEE International Conference on. IEEE, 1992.*
Bonchis, Adrian et al., "Robotic Explosive Charging in Mining and Construction Applications", IEEE Transactions on Automation Science and Engineering, Jan. 2014, pp. 245-250, vol. 11.
Patent Cooperation Treaty International Search Report and Written Opinion cited in PCT/US16/62279 dated Feb. 3, 2017 (7 pages).

* cited by examiner

*Primary Examiner* — Shefali Goradia (74) *Attorney, Agent, or Firm* — Taft Stettinius & Hollister LLP; J. Bruce Schelkopf (57) ABSTRACT

Three-dimensional visual servoing for positioning a robot in an environment is facilitated. Three-dimensional point cloud data of a scene of the environment is obtained, the scene including a feature. The three-dimensional point cloud data is converted into a two-dimensional image, and a three-dimensional position of the feature is identified based on the two-dimensional image. An indication of the identified three-dimensional position of the feature is then provided.

20 Claims, 8 Drawing Sheets

THREE-DIMENSIONAL VISUAL SERVOING FOR ROBOT POSITIONING

BACKGROUND

Some current robotic visual servoing techniques use two-dimensional scanning, which is relatively fast and produces a manageable amount of data. Accuracy problems exist, however, particularly due to a lack of information about the depth of features in the images.

SUMMARY

Shortcomings of the prior art are overcome and additional advantages are provided through the provision of a method that includes facilitating three-dimensional visual servoing for positioning a robot in an environment, the facilitating comprising: obtaining three-dimensional point cloud data of a scene of the environment, the scene including a feature; converting the three-dimensional point cloud data into a two-dimensional image; identifying based on the two-dimensional image a three-dimensional position of the feature; and providing an indication of the identified three-dimensional position of the feature to a controller for positioning the robot.

Further, a computer system configured to perform a method is disclosed, the method including facilitating three-dimensional visual servoing for positioning a robot in an environment, the facilitating comprising: obtaining three-dimensional point cloud data of a scene of the environment, the scene including a feature; converting the three-dimensional point cloud data into a two-dimensional image; identifying based on the two-dimensional image a three-dimensional position of the feature; and providing an indication of the identified three-dimensional position of the feature to a controller for positioning the robot.

Yet further, a computer program product including a computer readable storage medium readable by a processor and storing instructions for execution by the processor is provided for performing a method that includes: facilitating three-dimensional visual servoing for positioning a robot in an environment, the facilitating comprising: obtaining three-dimensional point cloud data of a scene of the environment, the scene including a feature; converting the three-dimensional point cloud data into a two-dimensional image; identifying based on the two-dimensional image a three-dimensional position of the feature; and providing an indication of the identified three-dimensional position of the feature to a controller for positioning the robot.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein relate generally to three-dimensional vision guidance for industrial robots, for instance guidance relating to three-dimensional visual servoing to accurately position a robot to perform tasks. While examples are provided in the context of robotic underground mining and construction applications, aspects described herein can be applied to other situations where visual servoing is performed.

In some current approaches, accurate positioning of a robot tool to a feature in the environment is achieved by visual servoing with two-dimensional color cameras. Reliance on only two-dimensional image data may render the feature difficult to find due to the lack of depth information. In contrast, and as described herein, a three-dimensional (3D) camera obtains three-dimensional point cloud data of a scene of the environment, including point cloud data for points surrounding a feature of interest, such as a hole. Points of the point cloud are projected in a common direction to a common plane and their distances to the plane are calculated. In some examples, the projection occurs in a direction of an axis of the hole to provide a two-dimensional (2D) image. The three-dimensional point cloud data is converted into a two-dimensional grayscale or color image based on the imaging by the three-dimensional camera. The calculated distances to the plane information is converted to black, white and gray values (for example) to obtain a projected two-dimensional image. Differences in distance to the plane for the points in the point cloud are reflected by different intensities in the two-dimensional image. Thresholding can be applied to the distance values to help indicate the presence of features. A feature, such as a hole, may be shown as a distinct filled black circle, for instance, and detected from the two-dimensional image using two-dimensional image processing techniques such as Hough transform or blob detection techniques. Visual servoing to position the robot relative to the feature can then be done in three translation directions with the detected feature position in X, Y, and Z coordinates.

Figure 1:
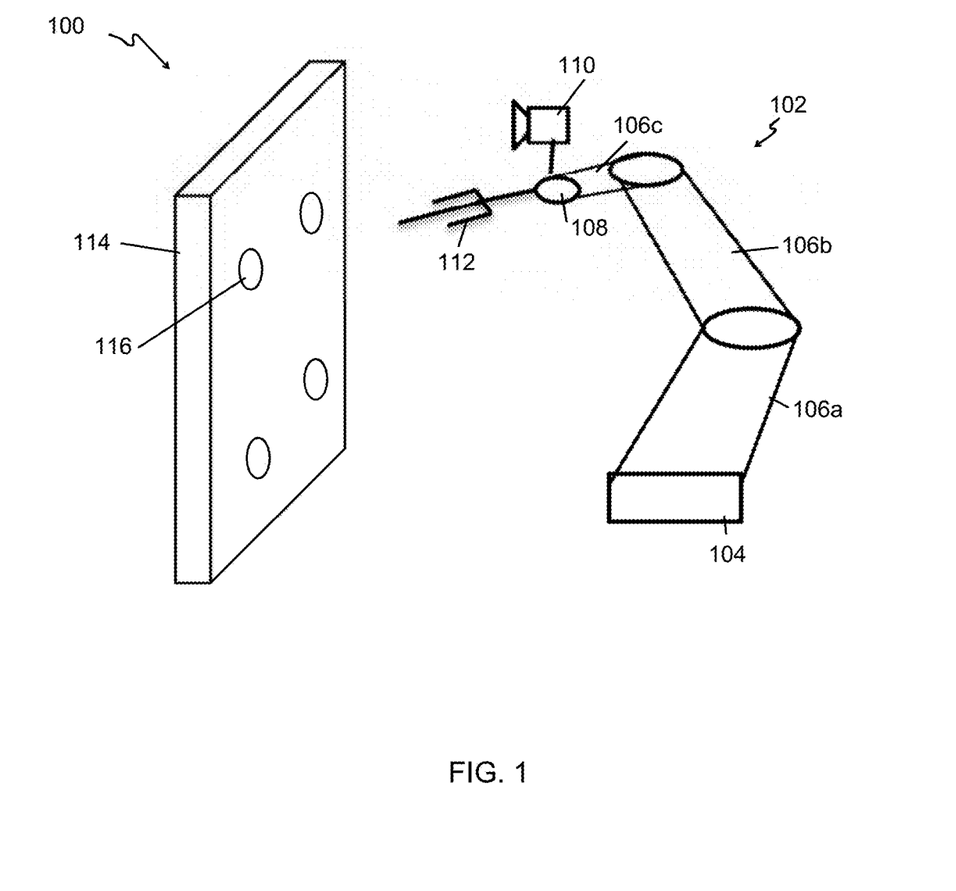
FIG. 1 depicts an example environment in which a robot performs work on a wall of features.

One such application is depicted by way of example and not limitation in FIG. 1, which specifically depicts an example environment in which a robot performs work on a wall of features. In environment 100, robot 102 includes a robot base 104 coupled to a robot mounting flange 108 via robot arms 106a, 106b, and 106c. Robot mounting flange 108 has tools mounted thereto, namely camera 110 and gripper 112 in this example. Robot 102 is adjacent to wall 114 and performs work on features 116 thereof.

In a specific example, wall 114 is a wall of rock in a mining operation, the features are holes 116 in the rock wall, and the robot's task is to fill each hole 116 with explosive materials. This kind of assistance from robots is useful in mining and other operations where the work environment is extremely dangerous because of structural risks, poor lighting conditions, and various other reasons.

In a common situation, the positions of the wall(s) and the holes are initially unknown to the robot and are estimated using three-dimensional scanning or imaging of the wall followed by hole detection (referred to herein as wall and feature location estimation features). Due to inaccuracies in that process, deviations from assumed robot characteristics, limitations in the estimation techniques, and/or other variables in the system, it may be difficult to position the robot relative to the hole with a desired level of accuracy. Visual servoing can offer a good solution to this problem, where the robot system is generally aware of the feature locations but servoing is used to position the tool precisely where needed in relation to the feature. Visual servoing works iteratively in which, at each iteration, new image(s) of the scene is/are taken, the position of the feature in an image frame is extracted, and the robot motion is adjusted to move the feature closer to a prescribed image location.

As noted above, some current techniques use two-dimensional video cameras for visual servoing. Due to the dark environments and rich textures of rock walls in mining operations, the extraction of a hole position in the image frame is challenging, even using various different image processing techniques.

The emergence of low cost and fast three-dimensional cameras, such as the Kinect® line of products offered by Microsoft Corporation, Redmond, Wash., USA (of which KINECT is a trademark), has made it possible to scan/image an unknown scene in real time with reasonable accuracy. The scanned/imaged model of the scene, typically represented in the form of a point cloud or a mesh model, can be readily imported into a computer-aided design (CAD) environment or other type of computer program for further processing. For industrial applications, the processing can be the identification and localization of features of interest to facilitate servoing so that the robot can move to the features to perform special operations. Additionally or alternatively, the processing can be generation of motion paths along which the robot can perform operations, such as painting or gluing.

Unlike the two-dimensional cameras that operate most effectively only in special lighting conditions and are sensitive to textures in the scene, three-dimensional cameras can provide three-dimensional point cloud data of the scene absent special lighting conditions. Feature (e.g. hole) detection and visual servoing using three-dimensional point cloud data is more reliable because, by definition, a hole has a much larger depth (Z-dimension) than its surroundings, which depth is captured in three-dimensional point cloud data. However, three-dimensional point cloud data consumes a significantly larger amount of data than two-dimensional image data—prohibitively large for many current computer systems used to perform servoing, such as an onboard computer system, to process fast enough. Processing three-dimensional point cloud data at thirty frames per second, for instance, is not possible using systems such as those used in-situ. Thus, while three-dimensional images provide more information about an environment, processing that data quickly enough to servo at reasonable speed is difficult or impossible.

In accordance with aspects described herein, one or more 3D camera(s) capture three-dimensional point cloud data of a scene of the environment. At least some of this data is then converted into a two-dimensional image, such as a two-dimensional grayscale image. Depth values for points of the point cloud inform image intensity values for pixels of the two-dimensional image. Using the two-dimensional image, a three-dimensional position of the feature in the scene is identified and an indication of the position can be provided to a controller for positioning the robot. Iteratively-generated two-dimensional images can be processed fast enough for servoing.

Conversion from the three-dimensional point cloud data to the two-dimensional image may include projecting points of the point cloud onto a common plane corresponding of a target location, such as an opening of a hole in a wall. A respective image value is determined for each of the points, where an image value indicates a distance value for the point relative to the common plane. The image value can be used as an intensity for, e.g., a gray value of a two-dimensional grayscale image. Further details are provided with reference to FIG. 2, which depicts example projections of points of a point cloud to a common plane in accordance with aspects described herein.

Figure 2:
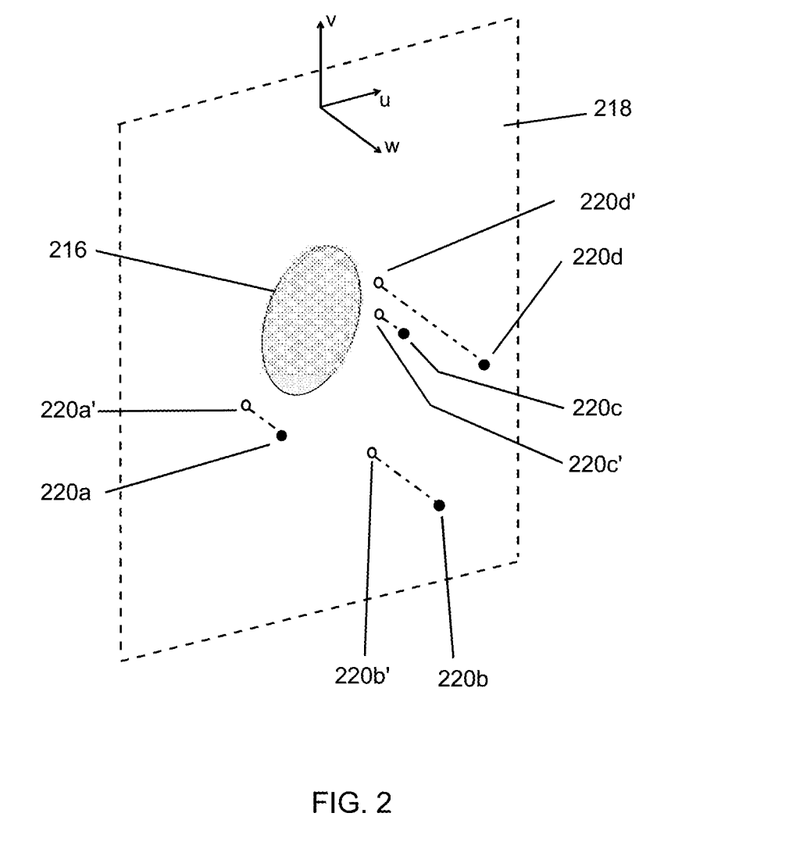
FIG. 2 depicts example projections of points of a point cloud to a common plane, in accordance with aspects described herein.

FIG. 2 shows a perspective view of a feature 216, in this case a hole in a wall, in relation to points 220a-220d of a point cloud (the shading represents the interior of the hole). The points are detected points of the wall as indicated by the point cloud data. In practical applications, the face of the wall be jagged and uneven, and the hole may not be perfectly round. The result of acquiring a three-dimensional image of the hole and surrounding portions of the wall is therefore a collection of points that form a point cloud, where the points have not only varying x-dimension and y-dimension values, but varying depth (z-values) relative to the camera. Only four points of the point cloud are shown in FIG. 2 for convenience reasons; it is understood that actual point cloud data will include data for thousands or millions of points.

In this perspective view, points 220a-220d are varying distances away from common plane 218. These distances are shown by projection lines extending from each point 220a-220d to its projected location on plane 218 when projected in a common direction. Point 220a corresponds to projected point 220a', point 220b corresponds to projected point 220b', point 220c corresponds to projected point 220c', and 220d corresponds to projected point 220d'. The common plane is, in this example, a plane across an opening of hole 216. Because the opening may not be a perfect circle, the plane may be an average or best fit plane across the opening. The projections of the points are akin to flattening the points in a common direction to plane 218. The direction extends, in one example, in the same direction as a central axis of the hole 216, and in that scenario, the common plane 218 is perpendicular to the central axis. The farther a point is from the plane, the longer the projection distance and the greater the variation in depth relative to the plane. In an example, a feature identification step is performed prior to visual servoing, in which the feature identification identifies the features (e.g. holes) in the point cloud or mesh model of the wall, including the location of the hole opening and the orientation of the hole axis. The choice of common projection plane can be obtained from this feature identification and localization step. This step can roughly determine the position and orientation of the features in the point cloud data, for example, the location of the hole opening and the orientation of the hole axis. The common projection plane can then be chosen to pass through the hole opening and perpendicular to the hole axis. In FIG. 2, a local coordinate system UVW is attached to the common projection plane 218. The W axis of the coordinate system is the projection line perpendicular to the plane. The transformation between coordinate frame UVW of the common plane and coordinate frame XYZ of the point cloud data is available from the common plane equation. Mathematically speaking, projection of points of point cloud data onto the common plane is equivalent to expressing the same points originally in coordinate frame XYZ into a new coordinate frame UVW. The W coordinate of a point is the signed distance of that point to the common plane. The U and V coordinates are related to the rows and columns of the converted two-dimensional image. Feature position for visual servoing is determined first in the coordinate frame UVW.

When performing the projection, filtering might be applied to remove points from the point cloud data that are either irrelevant to, or might interfere with, the feature detection. One example of filtering is to remove all points outside of an interested region to reduce computation cost. Another example of filtering is to remove noise data. A group of points that are farthest away from a hole opening surface in a point cloud of the area may be considered noise data and can be filtered out. Prior knowledge of the feature can be used to define the filtering criteria. In the hole example, if the depth of the hole is roughly known prior, then any points for which distance to the hole opening are larger than the hole depth can be filtered out.

The projection to the common plane 218 provides a two-dimensional image formed of projected points (e.g. $220a'$-$220d'$) with associated image intensity values. The image intensity value to use for a projected point in the two-dimensional image is determined, in some embodiments, by applying a linear mapping function to the three-dimensional point cloud data for that point. As a simple example, if the projection distance, or the W coordinates, for points of the point cloud range from −1,000 to +1,000 and the two-dimensional image is a grayscale image with intensities ranging from 0 (for white) to 255 (for black), the linear mapping function can map each value on the interval (−1,000, 1,000) to an appropriate integer value from 0 to 255, inclusive. In accordance with additional aspects, thresholding can be applied when performing this mapping, in which the linear mapping function has lower and upper bounds to threshold the projection distance (W coordinate) of each point. A projection distance (W coordinate) above the upper bound results in a maximum (or minimum) image intensity value, in the two-dimensional image, corresponding to that point, and a projection distance (W coordinate) below the lower bound results in a minimum (or maximum) intensity value, in the two-dimensional image, corresponding to that point. In the example of FIG. 2, the lower bound can be estimated by averaging the W coordinates of points on the hole opening surface, and the upper bound can be based on the lower bound (for instance lower bound plus some fraction, such as ¼, of the hole depth, if the prior knowledge of the hole depth is known). There are points in the three dimensional point cloud data that have W coordinates drastically varied from the W coordinates of nearby points that are not inside of the hole, which can be telling after the mapping function is applied that a hole is present and the particular points sit inside of the hole. The linear mapping can be applied to the three-dimensional point cloud data relatively rapidly to produce two-dimensional images fast enough to enable visual servoing. Where a feature is detected from the two-dimensional images, the robot controller or other computer system can correlate an identified position of the feature to the original three-dimensional point cloud data, for example the relatively small subset thereof that corresponds to the area of that feature. This subset is much more manageable for the system to process.

The data may be referenced to determine the depth (z-values) of points of the point cloud where the feature is present, in order to determine actual depth distances for purposes of moving the robot.

In accordance with aspects described above, a projection of filtered points of the point cloud data onto a common plane together with mapping (and optionally thresholding) of the projection distance to the common plane converts the three-dimensional point cloud data to create a two-dimensional image. A feature defined by differences of projection distance (e.g. a hole) may be represented in the two-dimensional image as a distinct black area, as shown in FIG. 3.

Figure 3:
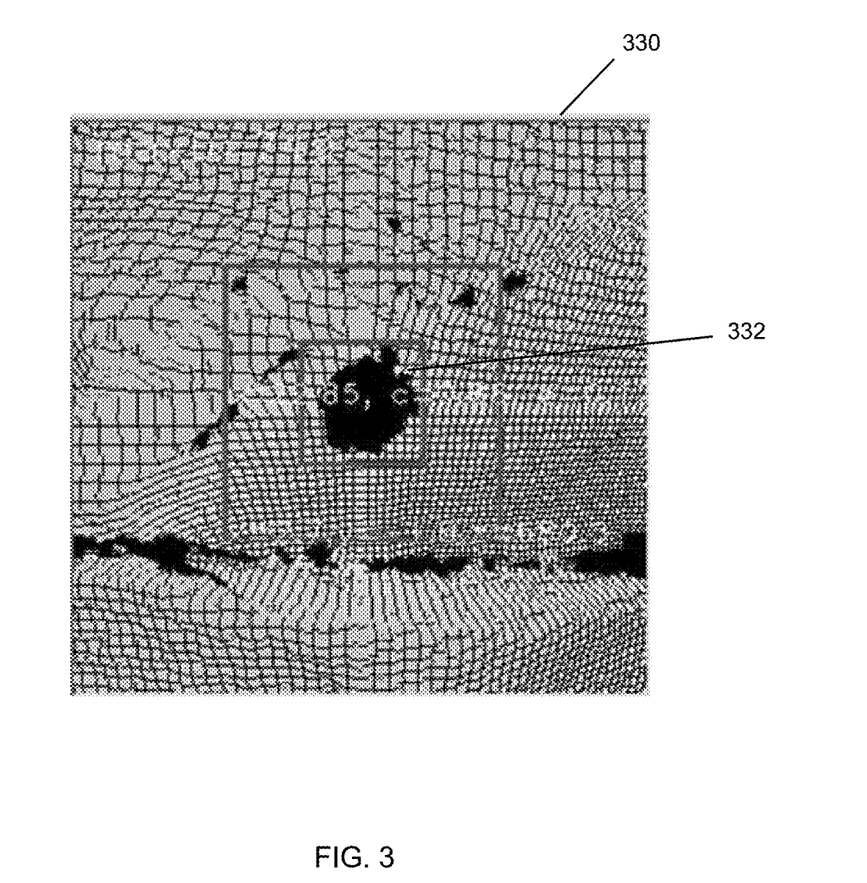
FIG. 3 depicts an example image converted from three-dimensional point cloud data in accordance with aspects described herein.

In FIG. 3, image 330 is a two-dimensional grayscale image converted from three-dimensional point cloud data by filtering and applying a linear mapping function with thresholding as described above. Thresholding causes areas with a projection distance greater than the threshold value to appear black in the image, and therefore hole 332 is plainly visible in this example. The upper/lower thresholds can be determined and set using any of various techniques to ensure that features with significant differences in projection distance (i.e. greater or less than a threshold) are highlighted in the two-dimensional image.

It is noted that while a hole may be generally circular, it need not be for the detection to identify its presence in the two-dimensional image. Consequently, the hole may or may not be axisymmetric, and the central axis may or may not be an axisymmetric axis.

Various detection techniques can be used to identify the three-dimensional position of the feature. Initially, based on projecting the points onto the common plane, first and second dimension components (e.g. u and v values) of the three-dimensional position of the feature may be determined using Hough transform or blob detection on the projected positions of the points. The third dimension (w-value) of the three-dimensional position of the feature may be determined based on projection distance (W coordinates) indicated by the determined image intensity values and/or by referencing the Z values of the points of the three-dimensional point cloud data that correspond to the identified u-v position of the feature, as examples. If needed, the three-dimensional position of the feature in UVW frame can be converted to the original XYZ frame using the common plane equation.

Additionally or alternatively, Hough transform feature detection and/or blob detection can be used to extract the u and v coordinates values of a hole center position of the hole. The w-coordinate value of the hole center position can be estimated by averaging the w coordinates of points at a surrounding surface of the hole.

Figure 4A:
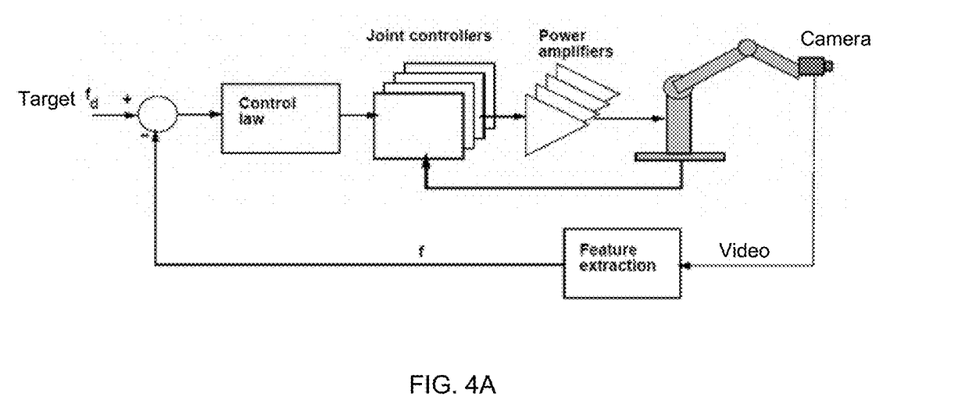
FIGS. 4A and 4B depict example visual servoing methods.
Figure 4B:
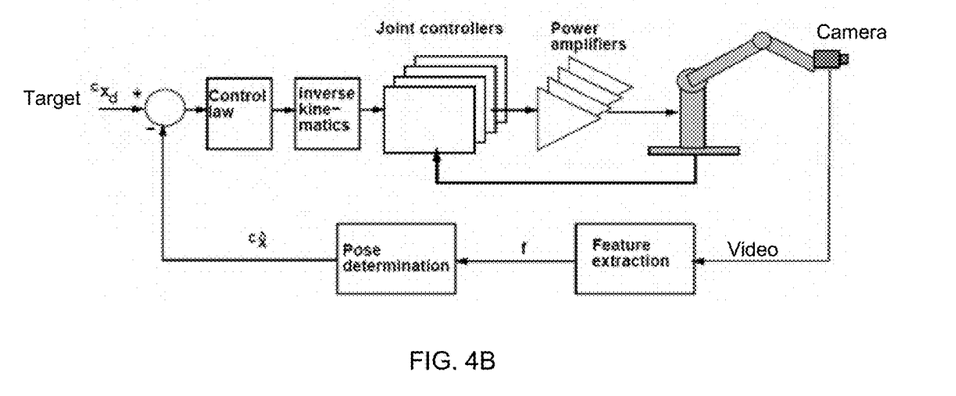

Once the three-dimensional position of the feature is known and provided to the controller, the robot can move based on the indicated position closer to a preset target location, which may be a location relative to the feature, such as a location close enough for the robot to perform work on the feature. How this feature position is used depends on the actual method of the visual servoing, examples of which are depicted in FIGS. 4A and 4B. More specifically, FIG. 4A depicts an example image-based visual servoing method and FIG. 4B depicts an example position-based visual servoing method. The three-dimensional position of the feature in coordinate frame UVW obtained from above is the feature position in the feature space, shown as fin FIGS. 4A and 4B. In the image-based visual servoing method (FIG. 4A), the target location is also defined in UVW frame. For example, if the range of U, V, W coordinates for the filtered points of point cloud data are from −1000 mm to 1000 mm, a choice of target location (0,0,0) will move the hole center in FIG. 3 to the center of the image window. If the position-based visual servoing method (FIG. 4B) is used, the three-dimensional position of the feature in coordinate frame UVW obtained from above is converted to the coordinate frame XYZ and then to the robot frame. The target location in this case will be a position defined in the robot frame. Selection of the target location in both image-based and position-based visual servoing is based on preferred position of the gripper (or other tool) in relation to the feature and the visibility of the feature in the camera field of view. The process of obtaining point cloud data, converting it to a two-dimensional image, identifying to feature position, and providing the indication to the controller can be iterated one or many times based on moving the robot closer to the preset target location.

Figure 5:
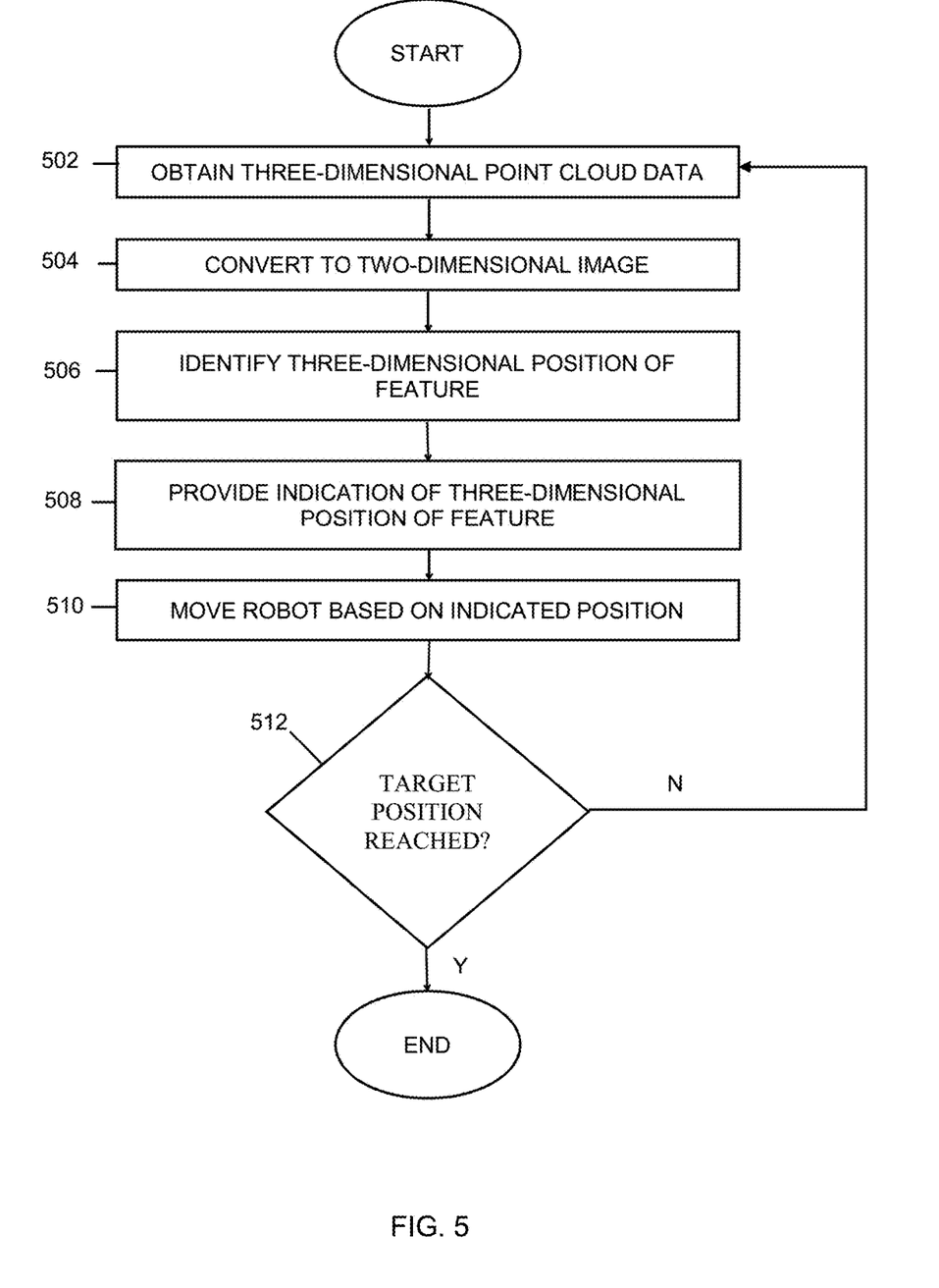
FIG. 5 depicts an example process for positioning a robot in an environment, in accordance with aspects described herein.

Accordingly, FIG. 5 depicts an example process for positioning a robot in an environment, in accordance with aspects described herein. The process begins by obtaining three-dimensional point cloud data of a scene of an environment, the scene including a feature (502). The feature may be a hole in a wall, for instance. The process then converts the three-dimensional point cloud data into a two-dimensional image (504). This converting includes, in some examples, a mathematical filtering and projection of a plurality of points of the point cloud onto a common plane and determining a plurality of image values, such as image intensity values, for the plurality of points. Each such point may have a distance value associated therewith, indicative of a distance between the point and the common plane. Thus, each image value of the plurality of image values may be for a respective point of the plurality of points, and the image value indicates the distance value for the point relative to the common plane. In some examples, the common plane onto which the plurality of points of the point cloud are projected is perpendicular to an axis of the feature, such as a central axis where the feature is a hole.

The two-dimensional image is in some embodiments grayscale and in other embodiments color. Determining the plurality of image values may include applying a linear mapping function to the three-dimensional point cloud data for the plurality of points. The linear mapping function can map the point cloud data for the points to a scale used for grayscale/color intensity values. The linear mapping function may have lower and/or upper bound(s) that threshold the respective distance value indicated for each point. In this case, a value, for a point, above the upper bound results in a maximum intensity in the two-dimensional image for that point, and a value, for a point, below the lower bound results in a minimum intensity in the two-dimensional image for that point.

The process continues by identifying based at least in part on the two-dimensional image a three-dimensional position of the feature (506). This identifying includes, in some embodiments determining, based on the projecting onto the common plane, first and second (e.g. u-dimension and v-dimension) components of the three-dimensional position of the feature using Hough transform or blob detection on projected positions of the points, and determining a third (e.g. w-dimension) component of the three-dimensional position of the feature based on distance values indicated by the determined plurality of image values. Additionally or alternatively, identifying the three-dimensional position of the feature can include determining a hole center position in the plane using Hough transform or blob detection, where a distance value of the hole center position is determined based on averaging distance values for points at a surrounding surface of the hole.

An indication of the identified three-dimensional position of the feature is then provided (508) to a controller (for instance) to move the robot. Thus, the process continues by moving the robot based on the indication of the position of the feature in the scene (510). In some embodiments, the target location for the robot's movement is not the feature itself but is some other target location, such as a preset location and/or a location determined in relation to the feature position. As a specific example, the target location may be a location within the robot's working envelope or work area.

Visual servoing is accomplished by performing steps 502-510 repeatedly, usually rapidly, as the robot's movements are updated. Thus, the process determines, based on the movement of the robot effected at 510, whether the target position has been reached (512). If so, the process ends. Otherwise, the process returns to (502) to iterate steps 502-510. Visual servoing is accomplished by iterating this process until the robot reaches the target position.

The process of FIG. 5 may be performed by one or more computer systems, and some aspects may be performed by one set of computer system(s) while other aspects may be performed by another, perhaps different, set of computer system(s). In this regard, steps 502, 504, 506 and 508 may be performed by one or more computer systems to facilitate three-dimensional visual servoing for positioning a robot in the environment, while the same or other computer system(s) may be responsible for controlling the movement of the robot (510), i.e. based on the provided indications of feature position. This enables different computer system(s) to handle different aspects of visual servoing as described herein, if desired.

Figure 6:
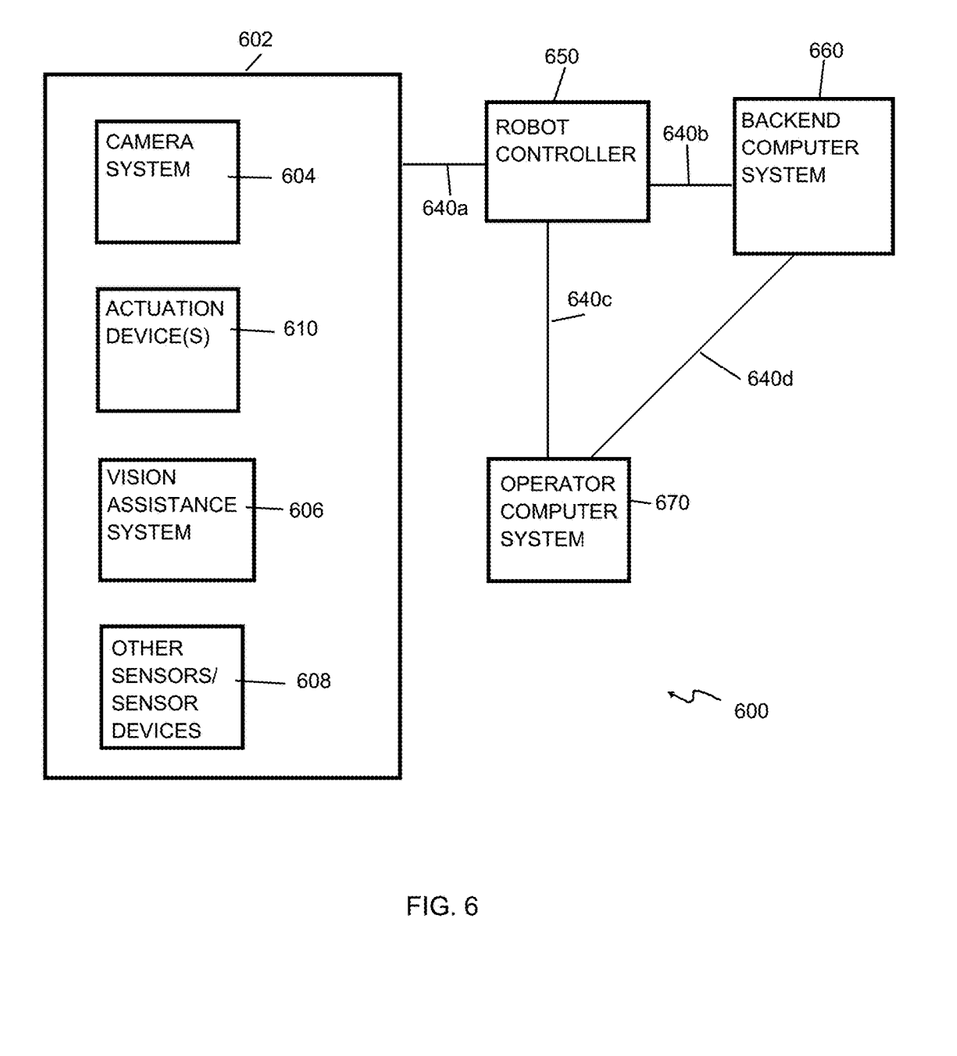
FIG. 6 depicts an example of a system to incorporate and use aspects described herein.

FIG. 6 depicts an example system to incorporate and use aspects described herein. System 600 includes a robot 602, robot controller 650, operator computer system 670, and backend computer system 660, all coupled via communication links 640a-640d. The physical locations of these components relative to one another can vary. For instance, they may be as close together as a few feet or as far apart as thousands of miles or more.

Communication links 640a-640d between the components may be realized by any of various wireless and/or wired technologies (e.g. fiber-optic/radio/cable on different types and layers of data protocols). In some embodiments, one or more such communication links includes existing infrastructure, such as existing Ethernet installations operating over one or more local or wide area network(s). A non-limiting list of additional communication link technologies includes wireless-LAN (WLAN), Bluetooth, ZigBee, near-field, or other wireless links, point-to-point radio systems or laser-optical systems, and satellite communication links, as examples.

Robot 602 may be any type of robot, such as an industrial robot offered by ABB Inc. of Auburn Hills, Mich., U.S.A., as an example. Example robots have several (usually 4, 5, 6 or 7) degrees of freedom enabling them to perform any of various tasks usually characterized by the movement and/or manipulation of objects. In this regard, a robot refers in its broadest sense to an assembly that has multiple degrees of freedom.

Robot functions are served by different, and typically application-specific, components, some of which are depicted as part of the example robot 602 of FIG. 6. It should be understood that robot 602 includes additional components omitted from FIG. 6 for convenience purposes, and further that a robot to incorporate/use aspects described herein need not necessarily include each of the components depicted in FIG. 6.

Camera system 604 provides imaging functions enabling the robot to 'see' physical objects in its environment. Camera system 604 may be realized by proprietary and/or application-specific imaging device(s) or commercial off-the-shelf (COTS) offerings providing 2-dimentional, 3-dimensional, and/or depth-sensing imaging capabilities. An example COTS product is the Kinect® motion controller offered by Microsoft Corporation. Vision assistance system 606 is another type of sensor system providing vision capabilities for the robot. It can also include imaging device(s) for imaging objects of the environment to assist in proximity or other spatial determinations. In some embodiments, the camera system 604 is mounted on the robot at or near a 'head' thereof providing a roughly 1st-person perspective of the robot's activities, while the vision assistance system 606 includes multiple cameras mounted around the robot 602 and imaging the robot 602 and its surroundings to provide a 3rd-person perspective of robot activities with respect to the surrounding objects.

Other sensor/sensor devices 608 are included to provide additional sensing capabilities. The particular additional sensors may be dependent on the types of tasks the robot will perform when in operation. A non-limiting list of additional sensors are microphones, position sensors, proximity sensors, and force/pressure sensors, as examples. Some sensor devices can include data processing capabilities. So-called smart sensors are usually, though not always, connected directly to robot controller 650 via communication link(s). Other types of sensors that lack on-board data processing capability to process captured data may provide data to a separate data processing device (such as robot controller 650, backend computer system 660, operator computer system 670, and/or another computer system, not pictured) to process the sensor device output.

Some sensors may be local to, or remote from, the robot 602 or robot controller 650. Remote sensor devices can provide input signals to the robot controller 650 that the robot controller 650 uses to control the robot 602 in performance of work described herein.

Some sensors that are mounted either on the robot 602 or at other locations can detect, or provide data that is processed to detect, obstacles that enter into or otherwise appear in the workspace of the robot 602. Sensor information including data about the detected obstacle can be processed and used by robot controller 650 for position and other geometric information. With respect to a smart sensor, a data processing capability thereof can fully or partially process sensor information and transfer to the robot controller 650 only the relevant data about the obstacle. In other types of sensors that lack data processing capability, the sensor information can be processed by another data processing device as described above and provided to robot controller 650.

The robot 602 can also include actuator(s) or other devices (collectively referred to as actuation devices 610) incorporated into, mounted to, or next to, the robot 602 to provide object manipulation capabilities for manipulating or moving objects. Example actuation devices 610 include grippers, claws, fixtures, suction devices, conveyors, twisting mechanisms, hose and/or wire feeder mechanisms, and specialized equipment like medical tools, welding guns, or spraying guns. Many actuation devices are more generally referred to as robot "end effectors".

Robot controller 650 provides motion data to robot 602 to control actions thereof. Motion data includes commands, as examples, sent to and received by component(s) of the robot that cause the components to drive robot actions, movement to other locations, and other activities. Accordingly, robot controller 650 may be a computer system having programs (i.e. instructions, program code) that execute to provide motion data to the robot 602 to control motion of the robot 602 to perform work. For instance, the robot 602 may hold a tool (not shown) used to perform work on a stationary or moving workpiece (also not shown), or may hold the workpiece to have work performed on it by an appropriate tool, as examples. As further examples, the robot 602 may include a feeder component to feed a hose or other object into holes or other spaces to accomplish a task such as planting explosive material. The feeder component may include a twisting mechanism configured to twist the hose or other object in order to more reliably reach desired locations.

Sensor information provided to the robot controller 650 directly or indirectly, such as via a data processing component to process sensor data, may be used to generate a safety zone in which the robot 602 may work. When obstacles enter into the workspace of the robot 602 based on repositioning the obstacle or the robot, a map can be built to inform the robot controller 650 of the safety zone. Additionally, information from sensor(s) or other components, such as components 604, 606 and/or 608, can be used by the robot controller to build a distance map and/or ⅔-dimensional map. In some examples, raw sensor information is processed to build the map.

Robot controller 650 is in communication with operator computer system 670 used in controlling and/or observing robot behavior. The operator computer system 670 can show on a display thereof actual data about robot motion and attached processes, for example, camera images, acoustic feedback, and sensor values. Additionally, operator computer system 670 can act as a data processing device for sensor information, and can process data in both directions (i.e. data to/from the sensors). Operator computer system 670 may be implemented by any computer system desired, for instance an industrial personal computer or a programmable logic controller, as examples.

Some embodiments may feature at least partial control of the robot 602 by operator computer system 670. The operator computer system 670 can play a role in dictating, selecting, building, and/or providing commands or other signals to the robot 602 and/or robot controller 650 to cause the robot 602 to perform actions. In some examples, the operator computer system 670 has at least one teleoperation input device, such as joysticks or stylus-type devices that the operator can use to create continuous motion signals (position and/or speed signals) that can be provided to the robot 602 directly or via robot controller 650. Some teleoperation input devices can provide feedback to an operator based on, for example, input from sensors of the robot 602. Feedback can be any kind of feedback that can be sensed by an operator. An example is haptic or force feedback that causes a vibration in a joystick or a stylus.

The operator computer system can also include a safety enable device, such as a three-position switch, to provide the ability for the operator to enable or disable power to the robot 602 and/or other components of the system 600.

Backend computer system 660 can provide additional local or remote computing resources to support robot controller, operator computer system 670, and/or robot 602. In this regard, control of the robot 602 and/or other processes supporting robot tasks may be more demanding than can be handled by the front-end systems. A local or remote backend facility may be provided by backend computer system 660, and the front-end components can off-load work to the backend computer system 660. By way of specific example, processing of image data, especially 3-dimentional image data, may present a significant burden on the robot 602, sensors thereof, and/or robot controller 650. The image data may be provided in part or whole to backend computer system 660 for processing and results can be provided back to the robot controller 650 or another component for use in robot processes.

As mentioned prior, components of system 600 need not be located adjacent to each other. Backend computer system 660 may be located on-site or offsite, for instance as a remote cloud-based computing facility that offers a web-based data-processing solution.

One or more of the foregoing components of system 600 may be encompassed by, or included in, one or more other of the foregoing components. Similarly, functionality described above of a given component may be incorporated into a different component of the foregoing components. Backend compute resources provided by backend computer system 660, for example, may be included in the robot controller 650 or operator computer system 670, or vice versa. In some embodiments, functionality of robot controller 650 and/or operator computer system 660 is incorporated into backend computer system 660.

Processes described herein may be performed by one or more computer systems or other processing devices. An example computer system to incorporate and use aspects described herein is depicted and described with reference to FIG. 7. Computer system 700 includes one or more processors 702, memory 704, and one or more I/O devices 706, which may be coupled to each other by busses and other electrical hardware elements (not depicted). Processor(s) 702 include any appropriate hardware component(s) capable of implementing functions, for instance executing instruction(s) (sometimes alternatively referred to as code, firmware and/or software) retrieved from memory 704. Execution of the instructions causes the computer system 700 to perform processes, functions, or the like, such as those described herein supporting control and/or operation of a robot.

Figure 7:
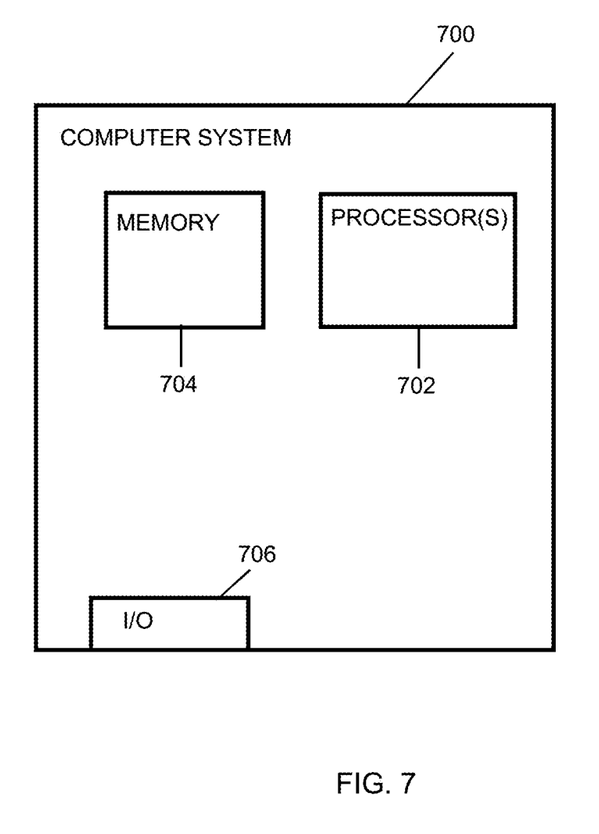
FIG. 7 depicts an example of a computer system to incorporate and use aspects described herein.

In some examples, aspects described herein are performed by a plurality of homogenous or heterogeneous computer systems coordinated to collectively perform processes, functions, or the like, such as those described herein supporting control and/or operation of a robot Memory 704 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 704 may be volatile, non-volatile, or a combination of the two. As a specific example, memory 704 includes one or more hard drives and one or more random-access memory (RAM) devices for, respectively, non-volatile and volatile storage of data. Example programs stored by memory include an operating system and applications that run on the operating system, such as specialized applications to perform functions described herein.

I/O device(s) 706 include hardware and/or software components that support input and output of data to/from computer system 700. I/O device(s) 706 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 706 also include, but are not limited to, I/O controllers and hardware and software supporting data communication with the aforementioned components, such as network, graphics, and/or audio controller(s). An example I/O device 706 is a network adapter for communication of data between computer system 700 and another component, such as another computer system, across communication links. Examples include Ethernet, cable, and/or fiber-based communications links passing data packets between computer system 700 and other systems across one or more networks, such as the Internet. Other example I/O devices 706 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 8:
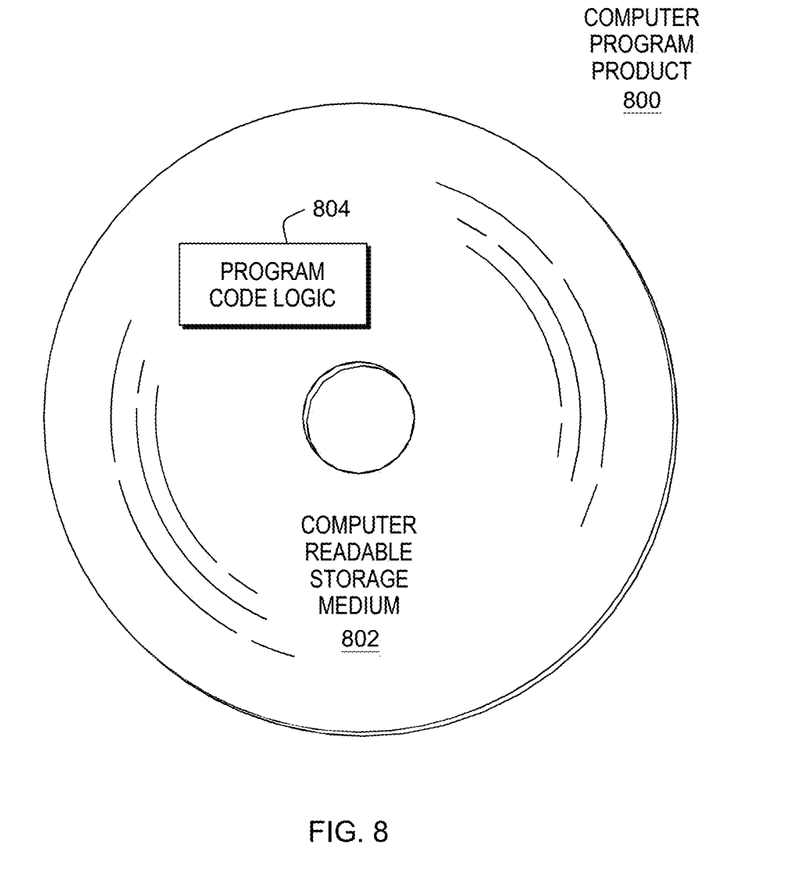
FIG. 8 depicts one embodiment of a computer program product.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 8, an example computer program product 800 is depicted that includes, for instance, one or more computer readable storage media 802 to store computer-readable program code means, logic and/or instructions 804 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described in flowcharts and/or block diagrams described herein. Thus, each block, or combinations of blocks, of the flowchart illustrations and/or block diagrams depicted and described herein can be implemented, in some embodiments, by computer program instructions. Behaviors/functions specified or performed by one or more blocks may occur in a different order than depicted and/or described, or may occur simultaneous to, or partially/wholly concurrent with, one or more other blocks.

The terminology used herein is for the purpose of describing particular embodiments only and is not limiting of the invention. As used herein, the singular forms "a", "an" and "the" include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not presented.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
    facilitating three-dimensional visual servoing for positioning a robot in an environment, the facilitating comprising:
    obtaining three-dimensional point cloud data of a scene of the environment, the scene including a feature;
    converting the three-dimensional point cloud data into a two-dimensional image, including projecting a plurality of points of the point cloud onto a common plane and determining a plurality of image values for the plurality of points, each image value of the plurality of image values being for a respective point of the plurality of points, and each image value indicating a distance value for the point relative to the common plane;
    identifying based on the two-dimensional image a three-dimensional position of the feature; and
    providing an indication of the identified three-dimensional position of the feature to a controller for positioning the robot.

2. The method of claim 1, wherein the converting the three-dimensional point cloud data into the two-dimensional image further comprises filtering the plurality of points of the point cloud.

3. The method of claim 2, wherein the two-dimensional image is either greyscale or color, and wherein determining the plurality of image values comprises applying a linear mapping function to the three-dimensional point cloud data for the plurality of points, the linear mapping function having lower and upper bounds thresholding the distance value indicated for each point.

4. The method of claim 3, wherein a value, for a point, above the upper bound results in a maximum intensity in the two-dimensional image and a value, for a point, below the lower bound results in a minimum intensity in the two-dimensional image.

5. The method of claim 2, wherein the identifying the three-dimensional position of the feature comprises (i) determining, based on the projecting onto the common plane, first and second dimension components of the three-dimensional position of the feature using Hough transform or blob detection on projected positions of the points, and (ii) determining a third dimension component of the three-dimensional position of the feature based on distance values indicated by the determined plurality of image values.

6. The method of claim 2, wherein the feature is a hole.

7. The method of claim 6, wherein the plane onto which the plurality of points of the point cloud are projected is perpendicular to an axis of the hole.

8. The method of claim 7, wherein identifying the three-dimensional position of the feature comprises determining a hole center position in the plane using Hough transform or blob detection, wherein a distance value of the hole center position is determined based on averaging distance values for points at a surrounding surface of the hole.

9. The method of claim 2, further comprising:
    moving the robot based on the indication of the position of the hole in the scene,
    wherein the moving moves the robot closer to a preset target location; and
    repeating the obtaining, the converting, the identifying, and the providing one or more times based on moving the robot.

10. A computer system configured to perform a method, the method comprising:
    facilitating three-dimensional visual servoing for positioning a robot in an environment, the facilitating comprising:
    obtaining three-dimensional point cloud data of a scene of the environment, the scene including a feature;
    converting the three-dimensional point cloud data into a two-dimensional image, including projecting a plurality of points of the point cloud onto a common plane and determining a plurality of image values for the plurality of points, each image value of the plurality of image values being for a respective point of the plurality of points, and each image value of the plurality of image values indicating a distance value for the point relative to the common plane, the plurality of image values being image intensity values of the two-dimensional image;

identifying based on the two-dimensional image a three-dimensional position of the feature; and providing an indication of the identified three-dimensional position of the feature to a controller for positioning the robot.

11. The computer system of claim 10, wherein the converting the three-dimensional point cloud data into the two-dimensional image further comprises filtering the plurality of points of the point cloud.

12. The computer system of claim 11, wherein the two-dimensional image is either greyscale or color, and wherein determining the plurality of image values comprises applying a linear mapping function to the three-dimensional point cloud data for the plurality of points, the linear mapping function having lower and upper bounds thresholding the distance value indicated for each point.

13. The computer system of claim 12, wherein a value, for a point, above the upper bound results in a maximum intensity in the two-dimensional image and a value, for a point, below the lower bound results in a minimum intensity in the two-dimensional image.

14. The computer system of claim 11, wherein the identifying the three-dimensional position of the feature comprises (i) determining, based on the projecting onto the common plane, first and second dimension components of the three-dimensional position of the feature using Hough transform or blob detection on projected positions of the points, and (ii) determining a third dimension component of the three-dimensional position of the feature based on distance values indicated by the determined plurality of image values.

15. The computer system of claim 11, wherein the feature is a hole.

16. The computer system of claim 15, wherein the plane onto which the plurality of points of the point cloud are projected is perpendicular to an axis of the hole, and wherein identifying the three-dimensional position of the feature comprises determining a hole center position in the plane using Hough transform or blob detection, wherein a distance value of the hole center position is determined based on averaging distance values for points at a surrounding surface of the hole.

17. An apparatus, comprising:
a non-transitory computer readable storage medium readable by a processor and storing instructions for execution by the processor to:
facilitate three-dimensional visual servoing for positioning a robot in an environment, the facilitate comprising:
obtain three-dimensional point cloud data of a scene of the environment, the scene including a feature;
convert the three-dimensional point cloud data into a two-dimensional image including projecting a plurality of points of the point cloud onto a common plane and determining a plurality of image values for the plurality of points, each image value of the plurality of image values being for a respective point of the plurality of points, and each image value of the plurality of image values indicating a distance value for the point relative to the common plane, the plurality of image values being image intensity values of the two-dimensional image, the image intensity values being greyscale or color intensity values;
identify based on the two-dimensional image a three-dimensional position of the feature; and
provide an indication of the identified three-dimensional position of the feature to a controller for positioning the robot.

18. The apparatus of claim 17, wherein the converting the three-dimensional point cloud data into the two-dimensional image further comprises filtering the plurality of points of the point cloud.

19. The apparatus of claim 18, wherein the two-dimensional image is either greyscale or color, and wherein determining the plurality of image values comprises applying a linear mapping function to the three-dimensional point cloud data for the plurality of points, the linear mapping function having lower and upper bounds thresholding the distance value indicated for each point.

20. The apparatus of claim 18, wherein the identifying the three-dimensional position of the feature comprises (i) determining, based on the projecting onto the common plane, first and second dimension components of the three-dimensional position of the feature using Hough transform or blob detection on projected positions of the points, and (ii) determining a third dimension component of the three-dimensional position of the feature based on distance values indicated by the determined plurality of image values.

* * * * *